United States Patent
Nassar et al.

(10) Patent No.: US 7,395,719 B2
(45) Date of Patent: Jul. 8, 2008

(54) PREFORMED SENSOR HOUSINGS AND METHODS TO PRODUCE THIN METAL DIAPHRAGMS

(75) Inventors: Marcos Nassar, Los Angeles, CA (US); Scott McDaniel, Simi Valley, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 0 days.

(21) Appl. No.: 11/552,064

(22) Filed: Oct. 23, 2006

(65) Prior Publication Data
US 2008/0110271 A1 May 15, 2008

Related U.S. Application Data

(63) Continuation-in-part of application No. 11/332,754, filed on Jan. 13, 2006.

(51) Int. Cl.
*G01L 7/00* (2006.01)
*H01G 7/00* (2006.01)

(52) U.S. Cl. ............ 73/756; 73/756; 361/283.4

(58) Field of Classification Search ........... 73/700–756; 361/283.1–283.4
See application file for complete search history.

(56) References Cited

U.S. PATENT DOCUMENTS

| | | | |
|---|---|---|---|
| 3,319,318 A | 5/1967 | Taimuty | |
| 3,503,116 A | 3/1970 | Strack | |
| 3,614,825 A | 10/1971 | Rottmiller | |
| 3,624,714 A | 11/1971 | Frassrand | |
| 3,911,902 A | 10/1975 | Deply | |
| 5,116,457 A | 5/1992 | Jerman | |
| 5,438,875 A | 8/1995 | Fung | |
| 5,573,007 A | 11/1996 | Bobo | |
| 5,712,428 A | 1/1998 | Schleiferbock | |
| 5,874,679 A | 2/1999 | Sokn | |
| 5,936,164 A * | 8/1999 | Sparks et al. | 73/724 |
| 6,167,761 B1 * | 1/2001 | Hanzawa et al. | 73/724 |
| 6,441,451 B1 * | 8/2002 | Ikeda et al. | 257/418 |
| 6,640,643 B2 * | 11/2003 | Ishio et al. | 73/718 |
| 6,756,248 B2 * | 6/2004 | Ikeda et al. | 438/53 |
| 6,877,383 B2 * | 4/2005 | Horie et al. | 73/754 |
| 6,923,069 B1 * | 8/2005 | Stewart | 73/723 |
| 2003/0029245 A1 | 2/2003 | Izadnegahdar | |
| 2005/0028603 A1 | 2/2005 | Kato | |
| 2005/0187487 A1 | 8/2005 | Azizkhan | |

OTHER PUBLICATIONS

Office Action dated Oct. 30, 2007, issued in corresponding U.S. Appl. No. 11/332,754.
Kurtz et al., "Ultra High Temperature, Miniature, SOI Sensors for Extreme Environments", Kulite Semiconductor Products, Inc., presented at the IMAPS International HiTEC 2004 Conference; Santa Fe, New Mexico, May 17-20, 2004.

* cited by examiner

*Primary Examiner*—Edward Lefkowitz
*Assistant Examiner*—Jermaine Jenkins
(74) *Attorney, Agent, or Firm*—Jeffer Mangels; Butler & Marmaro LLP (57) ABSTRACT

A preformed sensor housing including a conduit having an inside; a plug disposed within the conduit; and a deposit covering a portion of the plug and a portion of the conduit. A method is also disclosed for creating a thin film diaphragm on a housing including the step of inserting a sacrificial element into the housing; depositing a diaphragm material onto the sacrificial element and the housing; and removing the sacrificial element.

17 Claims, 13 Drawing Sheets

PREFORMED SENSOR HOUSINGS AND METHODS TO PRODUCE THIN METAL DIAPHRAGMS

This application is a continuation-in-part of U.S. patent application Ser. No. 11/332,754, filed Jan. 13, 2006, the entirety of which is hereby incorporated by reference.

BACKGROUND

1. Field of the Invention

The present invention relates generally to sensor housing construction, and more particularly, to preformed sensor housings and methods to produce thin metal diaphragms.

2. Background of the Invention

Diaphragms and membranes are structures that play a critical role in pressure sensors. Diaphragms are used in pressure sensors such that pressure is usually measured by detecting and quantifying the deflection of a diaphragm onto which pressure is applied. Another important application of diaphragms is to isolate two different media from each other, but still allow transmission of pressure from one medium to another. This is normally done to protect a pressure-sensing element from an incompatible environment by encapsulating the sensor in a housing that is filled with a neutral fluid such as silicone oil. The external pressure is transmitted to the oil, and therefore to the pressure sensor, through a flexible membrane that is hermetically attached to the housing. In this application, the diaphragm also functions as an isolation membrane to "isolate" one environment from the other. When these diaphragms and isolation membranes are metallic, they may be attached to housings by various methods such as welding, brazing, or with the use of adhesives. These attachment methods, however, are difficult to implement when the application requires very small diaphragms or membranes (i.e., diaphragms and membranes having very small diameters, or sizes). An example of such applications is implantable medical catheters used to measure pressure inside the body.

SUMMARY OF THE PREFERRED EMBODIMENTS

The present invention is directed to preformed sensor housings and methods for creating thin metal diaphragms on a housing. The diaphragm is preferably attached and hermetically sealed to the housing without the need for a separate attachment procedure such as laser welding or brazing. This method is particularly suited for producing miniature diaphragms and isolation membranes that cannot easily be attached to the rest of the mechanical system.

In one preferred embodiment, a method for creating a diaphragm includes inserting a sacrificial element into a housing and then coating (e.g., via electroplating) the sacrificial element/housing combination with a material (e.g., metal) suitable for use as a diaphragm or isolation membrane. The sacrificial element will then be removed, which leaves behind the diaphragm attached to the housing.

In another preferred embodiment, a method for creating a thin film diaphragm on a housing includes inserting a sacrificial element into the housing. Then, depositing a diaphragm material onto the sacrificial element and the housing, and removing the sacrificial element.

A sensor housing formed in accordance with one preferred embodiment of the present invention includes a conduit having an inside; a plug disposed inside the conduit; and a deposit covering at least a portion of the plug and a portion of the conduit.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention is directed to preformed sensor housings method for creating thin metal diaphragms on a housing. The thin metal diaphragm is attached to the housing and produces a seal (preferably hermetic) without the need of a separate attachment procedure such as laser welding or brazing. This method is particularly suited for producing miniature diaphragms and isolation membranes that cannot be easily attached to the rest of the mechanical system. In one preferred embodiment, the method includes inserting a sacrificial element into a tubular housing and then electroplating the sacrificial element/housing combination with a metal material suitable for use as a diaphragm or separation membrane. The sacrificial element can then be removed, which leaves behind the diaphragm attached to the housing.

Figure 1:
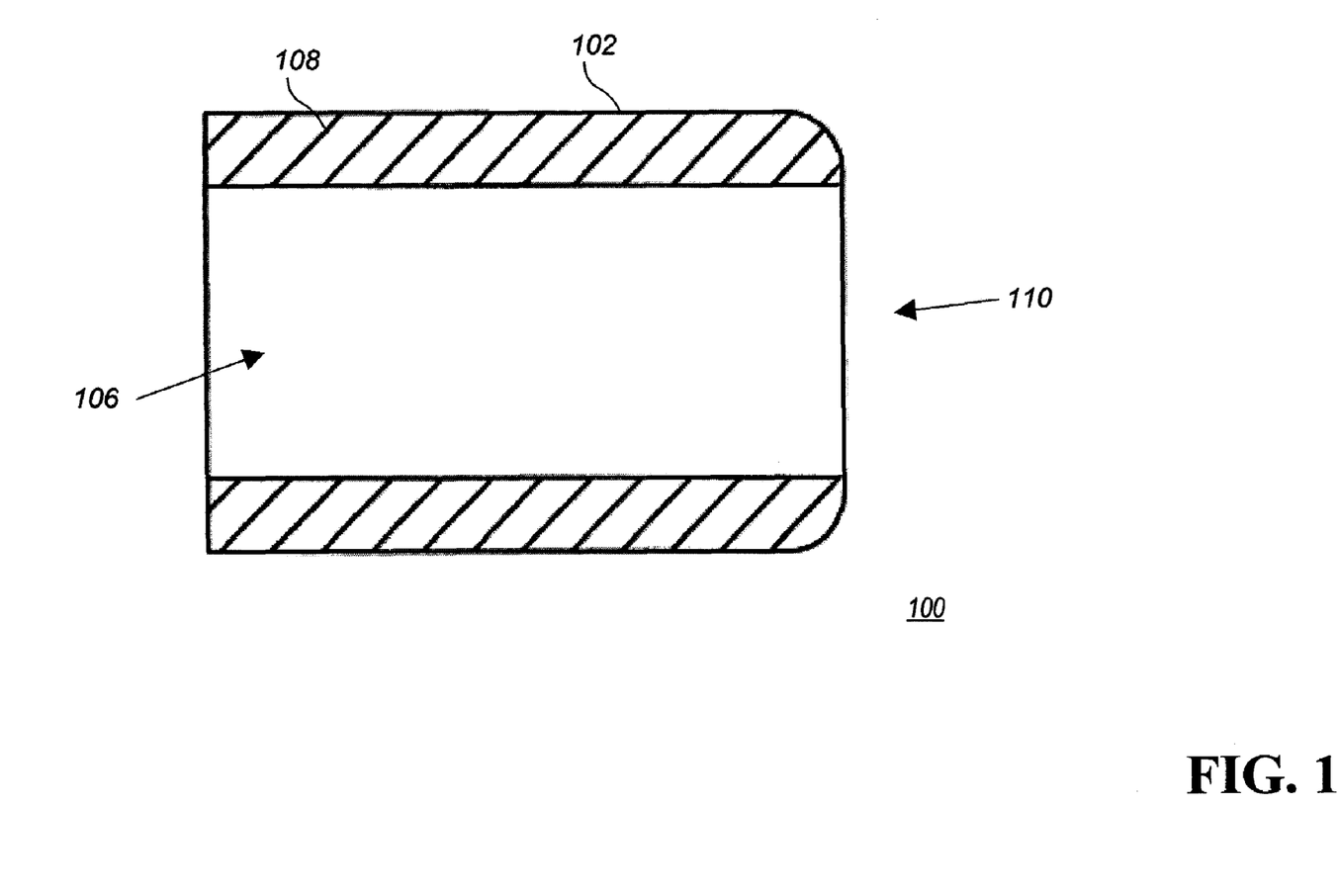
FIG. 1 is a cross-sectional view of a tube on which a diaphragm will be formed in accordance with one preferred embodiment of the present invention.
Figure 2:
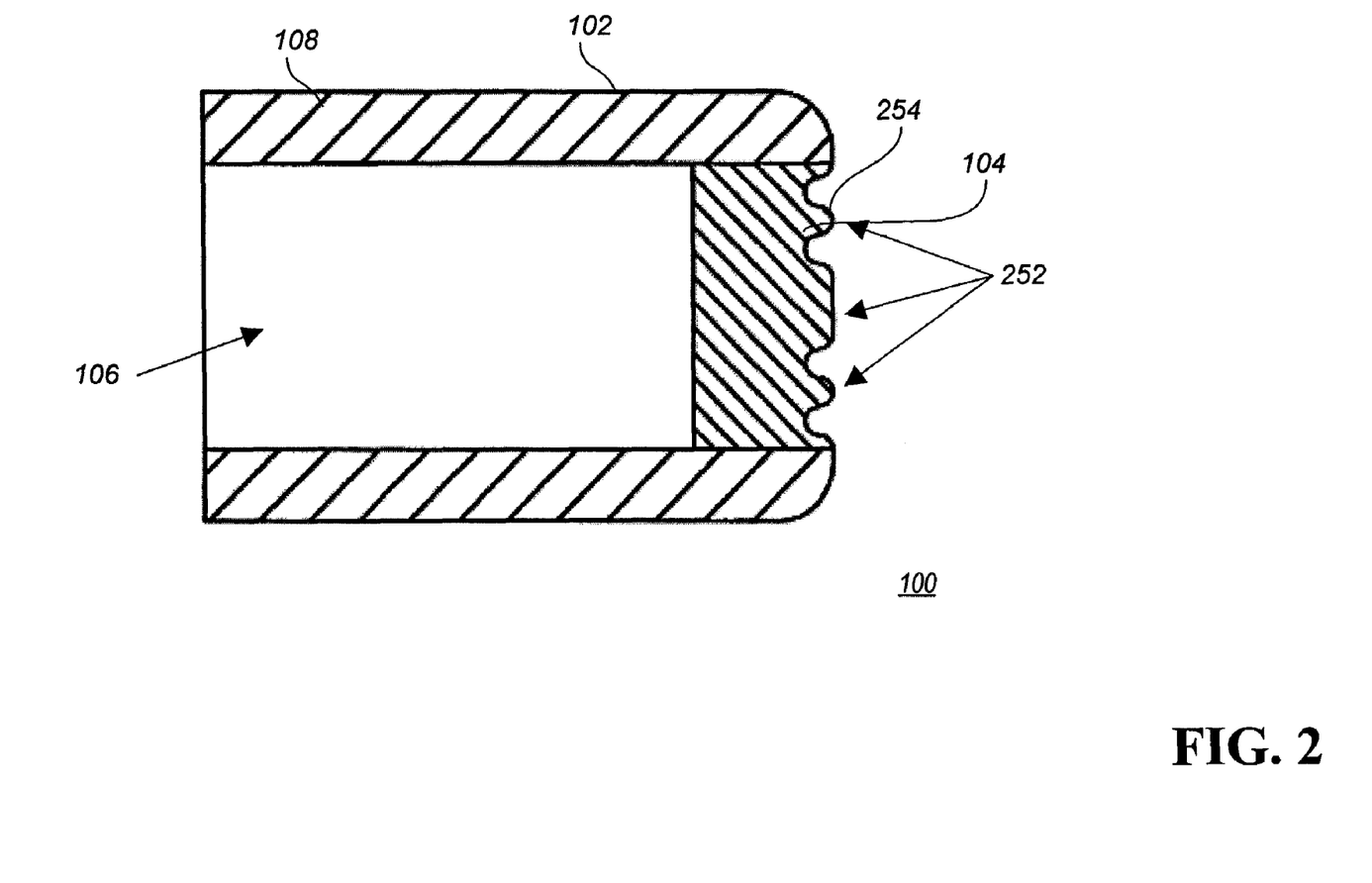
FIG. 2 is a cross-sectional view of the tube of FIG. 1 in which a sacrificial element has been inserted in accordance with one preferred embodiment of the present invention.

FIG. 1 will be used to describe a diaphragm formation process for a sensor tip assembly 100, which begins with the provision of a housing 102. In one preferred embodiment, housing 102 is metal and is tubular in shape. In other preferred embodiments, housing 102 may be formed of a variety of materials and have different cross-sections. Generally, the shape and structure of housing 102 may be thought of as a conduit. Housing 102 includes a front opening 110 and a sidewall 108 surrounding an interior 106. As illustrated in FIG. 2, a sacrificial element 104 is disposed in interior 106 of housing 102 at front opening 110, which is the end of housing 102 at which a diaphragm will be formed. The outer surface of sacrificial element 104 will determine the shape of the diaphragm that is formed thereon. In one preferred embodiment, sacrificial element 104 is configured with a plurality of ridges 252 on a corrugated surface 254. In other embodiments, sacrificial element 104 may be configured to have a variety of surface features, such as protrusions or indentations. For example, the surface may have bumps and/or dimples.

Figure 3:
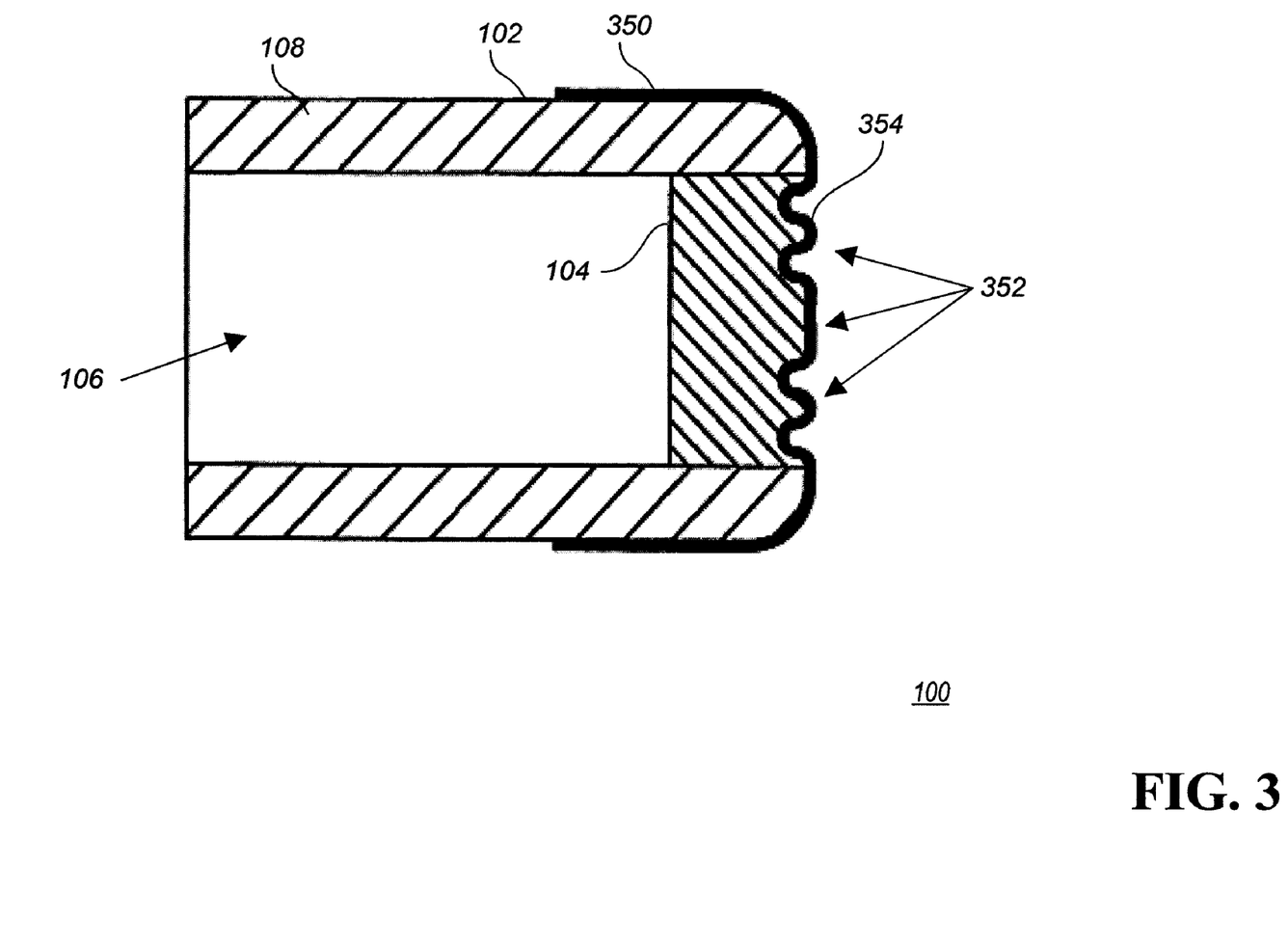
FIG. 3 is a cross-sectional view of the tube of FIG. 2 on which a thin diaphragm has been formed in accordance with one preferred embodiment of the present invention.

FIG. 3 illustrates the formation of a diaphragm 350 on sacrificial element 104 and housing 102. Diaphragm 350 comprises a suitable material that is deposited to a specific layer thickness. In one preferred embodiment, the formation of diaphragm 350 can be accomplished using electroplating, sputtering, or other deposition techniques. Diaphragm 350 includes a corrugated surface 354 that conforms to the surface configuration of corrugated surface 254, where corrugated surface 354 includes plurality of ridges 352 that also conforms to the surface configuration of corrugated surface 254 of sacrificial element 104.

Figure 4:
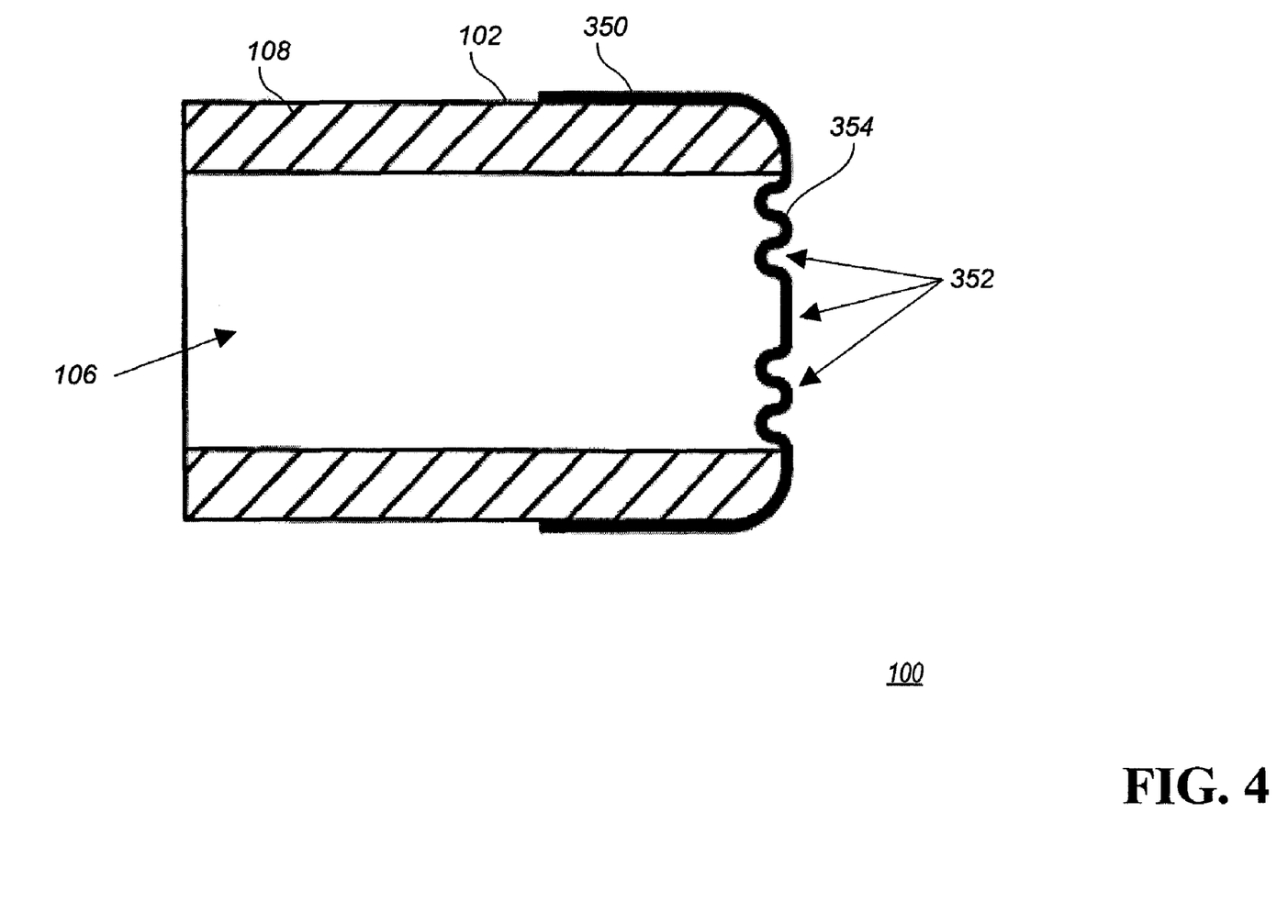
FIG. 4 is a cross-sectional view of the tube of FIG. 3 from which the sacrificial element has been removed in accordance with one preferred embodiment of the present invention.

In one preferred embodiment of the present invention, after diaphragm 350 has been deposited, sacrificial element 104 is chemically or thermally removed, leaving diaphragm 350 hermetically attached to housing 102. FIG. 4 illustrates sensor tip assembly 100 where sacrificial element 104 has been removed. In one preferred embodiment, the material of sacrificial element 104 is chosen such that it can be chemically dissolved, melted or otherwise removed without affecting either housing 102 or diaphragm 350. Exemplary materials that may be used for the sacrificial element include copper, lead, solder, and/or conductive polymers/plastics. Exemplary materials that may be used for the diaphragm include chromium and/or nickel. Exemplary materials that may be used for the housing include stainless steel and/or titanium.

Figure 5:
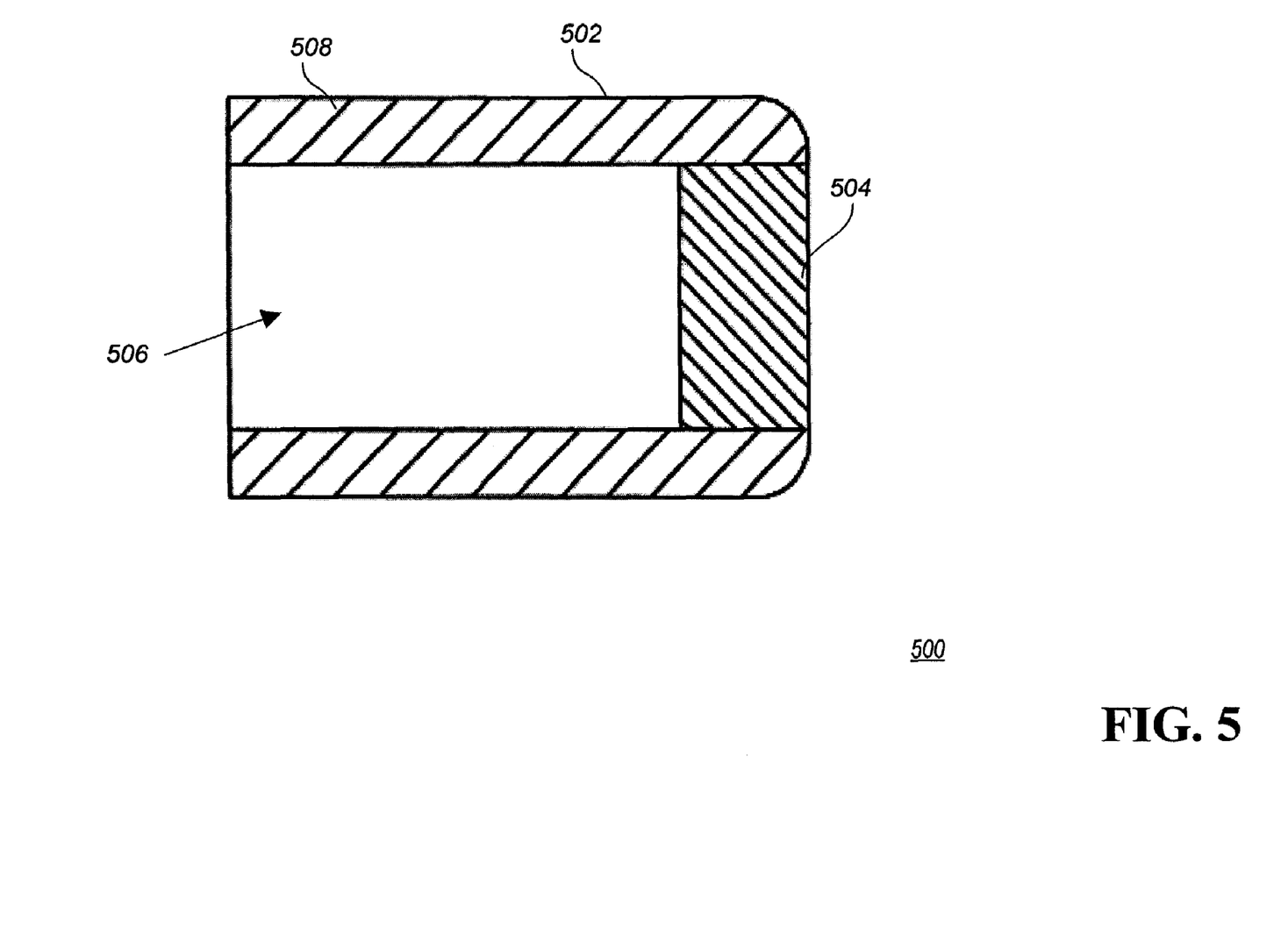
FIG. 5 is a cross-sectional view of a second tube in which an alternate version of a sacrificial element has been inserted in accordance with one preferred embodiment of the present invention.

FIG. 5 illustrates a sensor tip assembly 500, which includes a housing 502 having a flat sacrificial element 504 displaced therein. Flat sacrificial element 504 does not have a surface pattern, so that a diaphragm formed thereon will be generally flat. In other embodiments, a sacrificial element may have different surface patterns to shape a diaphragm formed thereon.

Figure 6:
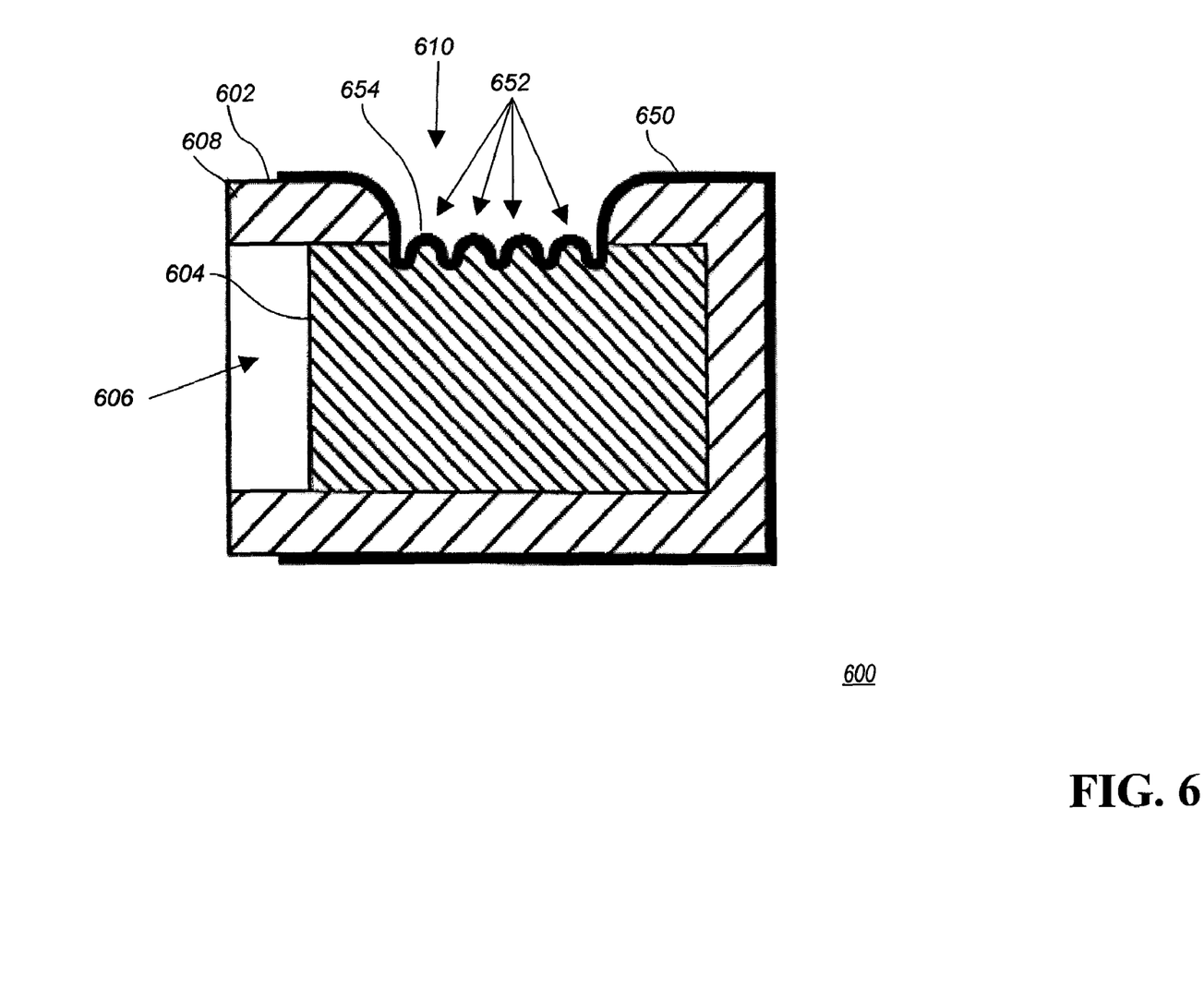
FIG. 6 is a cross-sectional view of a tube having a side-opening on which a diaphragm has been formed in accordance with one preferred embodiment of the present invention.

FIG. 6 illustrates an example of a diaphragm 650 fabricated on a side opening 610 of a housing 602 in accordance with one preferred embodiment of the present invention, where the shape of diaphragm 650 conforms to the outer surface pattern of a sacrificial element 604. Sacrificial element 604 is contained within an interior 606 of housing 602. For example, as illustrated in the figure, diaphragm 650 has a plurality of ridges 652 on a corrugated surface 654 that corresponds to the surface of sacrificial element 604.

Figure 7:
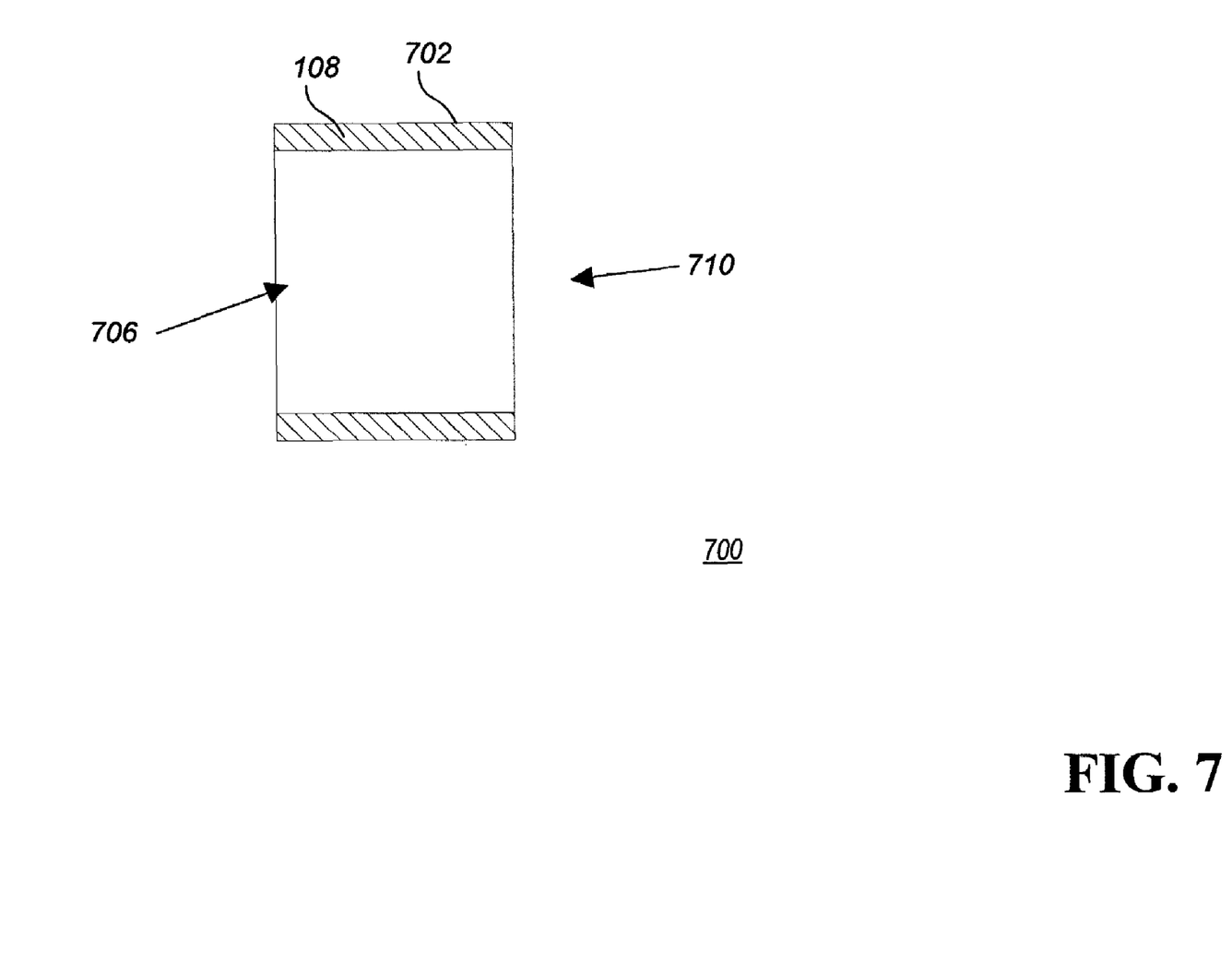
FIG. 7 is a cross-sectional view of a third tube on which a diaphragm will be formed in accordance with one preferred embodiment of the present invention.
Figure 8:
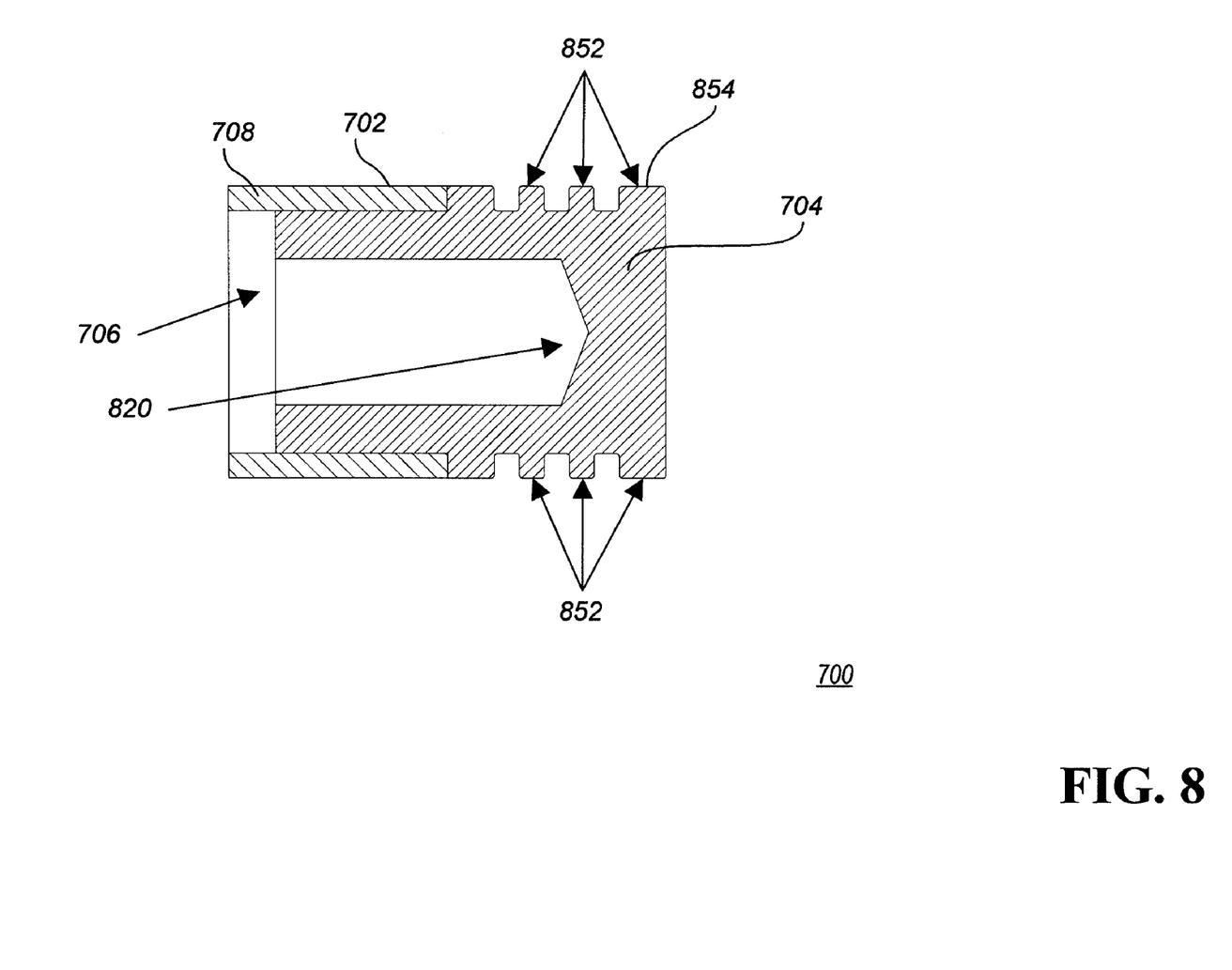
FIG. 8 is a cross-sectional view of the tube of FIG. 7 in which an alternate version of a sacrificial element has been inserted in accordance with one preferred embodiment of the present invention.

FIG. 7 will be used to describe a diaphragm formation process for a sensor tip assembly 700, which begins with the provision of a housing 702. In one preferred embodiment, housing 702 is metal and is tubular in shape. In other preferred embodiments, housing 702 may be formed of a variety of materials and have different cross-sections. Generally, the shape and structure of housing 702 may be thought of as a conduit. Housing 702 includes a front opening 710 and a sidewall 708 surrounding an interior 706. As illustrated in FIG. 8, a sacrificial element 704 is disposed in interior 706 of housing 702 at front opening 710, which is the end of housing 702 at which a diaphragm will be formed. The outer surface of sacrificial element 704 will determine the shape of the diaphragm that is formed thereon. In one preferred embodiment, sacrificial element 704 is configured with a plurality of ridges 852 on a corrugated surface 854. In other embodiments, sacrificial element 704 may be configured to have a variety of surface features, such as protrusions or indentations. For example, the surface may have bumps and/or dimples. In the embodiment of the sacrificial material as shown in FIG. 8, corrugated surface 854 is displaced on the sides of sacrificial element 704. Thus, as further described herein, the diaphragm that is formed is in the shape of a bellow.

In the preferred embodiment of the present invention, sacrificial element 704 includes a concave inner portion 820. Concave inner portion 820 is created in sacrificial element 704 to reduce the removal time required for sacrificial element 704. For example, where sacrificial element 704 is to be chemically removed, such as by chemical etching, a reduction in the amount of material in sacrificial element 704 will directly correspond to a reduction in the amount of materials to be chemically removed. Similarly, if the sacrificial element 704 is to be thermally removed, a reduction in the amount of material in sacrificial element 704 translates to a reduction in the heating and removal time for sacrificial element 704.

Figure 9:
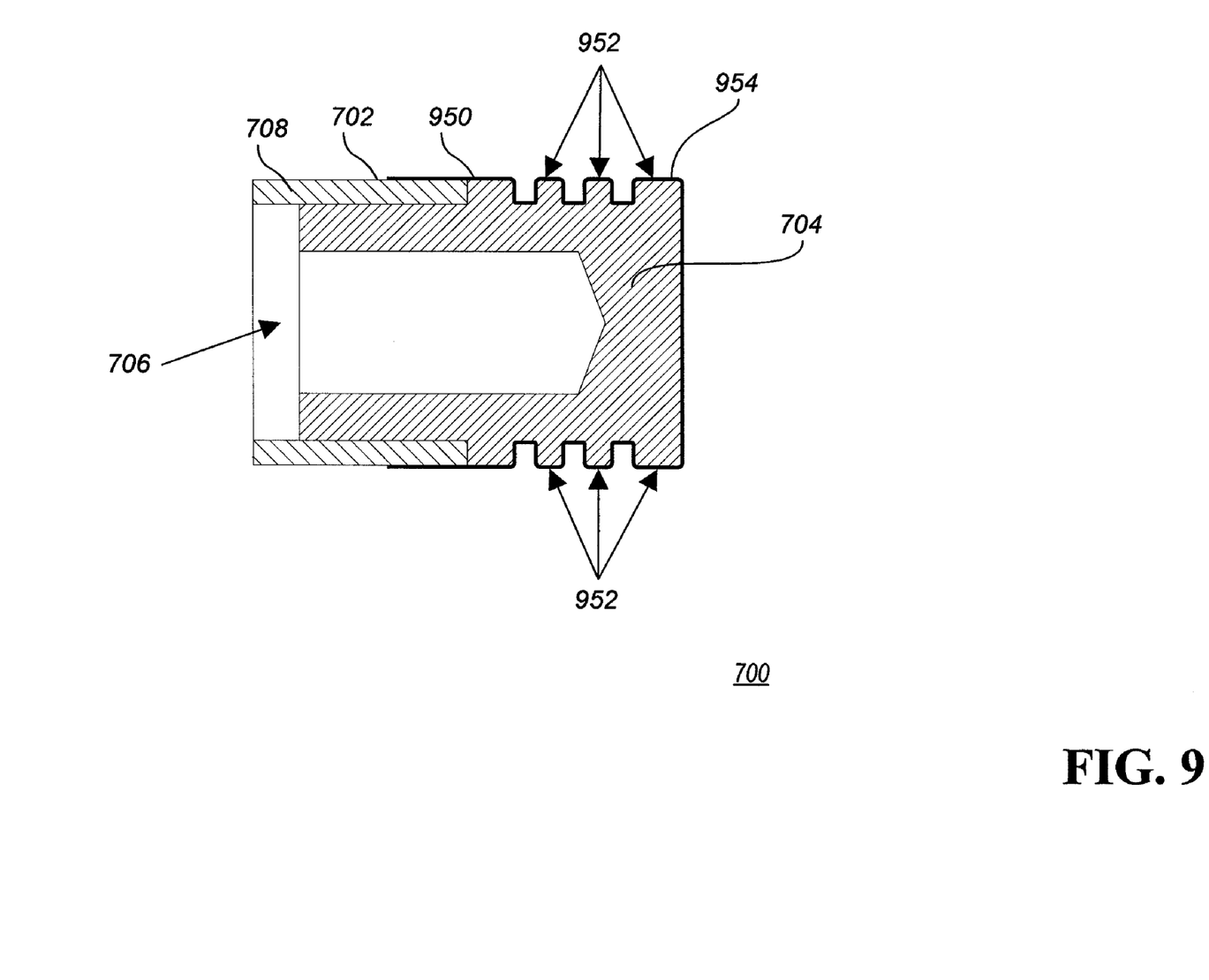
FIG. 9 is a cross-sectional view of the tube of FIG. 8 on which a thin diaphragm has been formed on the alternative version of the sacrificial element, in accordance with one preferred embodiment of the present invention.

FIG. 9 illustrates the formation of a diaphragm 950 on sacrificial element 704 and housing 702. Diaphragm 950 comprises a suitable material that is deposited to a specific layer thickness. In one preferred embodiment, similar to the formation of diagram 350, the formation of diaphragm 950 can be accomplished using electroplating, sputtering, or other deposition techniques. Diaphragm 950 includes a corrugated surface 954 that conforms to the surface configuration of corrugated surface 854, where corrugated surface 954 includes a plurality of ridges 952 that also conforms to the surface configuration of plurality of ridges 852 on corrugated surface 854 of sacrificial element 704. As discussed above, corrugated surface 854 is located on the side of sacrificed element 702. Thus, when diaphragm 950 is created, corrugated surface 954 will also be created on the side of diaphragm 950 and plurality of ridges 952 forms a bellows-like structure, where the plurality of ridges 952 are in the form of parallel rings around the side of diaphragm 950. In other preferred embodiments, other forms of an expandable/compressible structure may be created.

Figure 10:
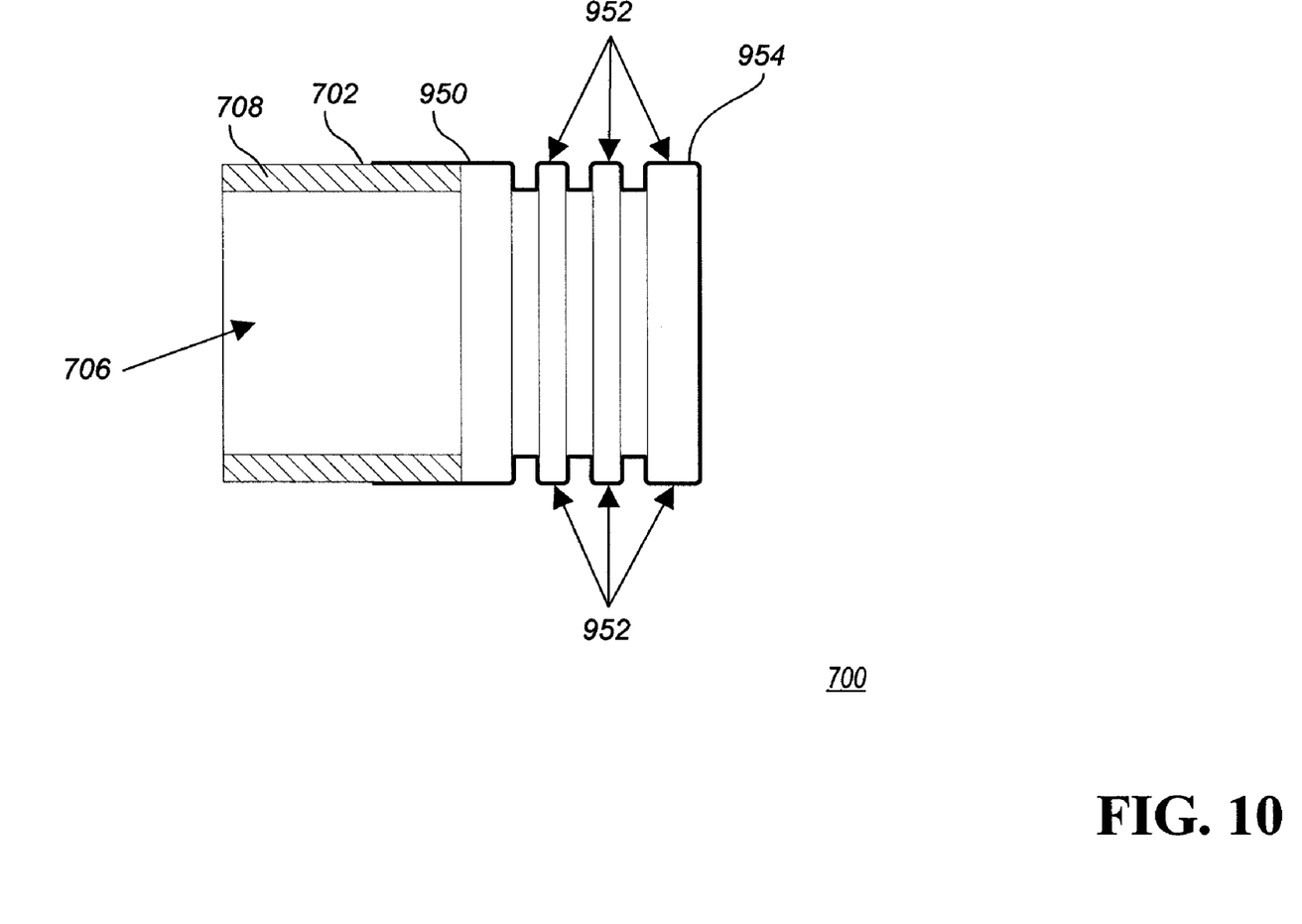
FIG. 10 is a cross-sectional view of the tube of FIG. 9 from which the sacrificial element has been removed from the alternate version of the sacrificial element in accordance with one preferred embodiment of the present invention.

In one preferred embodiment of the present invention, after diaphragm 950 has been deposited, sacrificial element 704 is chemically or thermally removed, leaving diaphragm 950 hermetically attached to housing 702. FIG. 10 illustrates sensor tip assembly 700 where sacrificial element 704 has been removed. In one preferred embodiment, the material of sacrificial element 704 is chosen such that it can be chemically dissolved, melted or otherwise removed without affecting either housing 702 or diaphragm 950. Exemplary materials that may be used for the sacrificial element include copper, lead, solder, and/or conductive polymers/plastics. Exemplary materials that may be used for the diaphragm include chromium and/or nickel. Exemplary materials that may be used for the housing include stainless steel and/or titanium.

Figure 11:
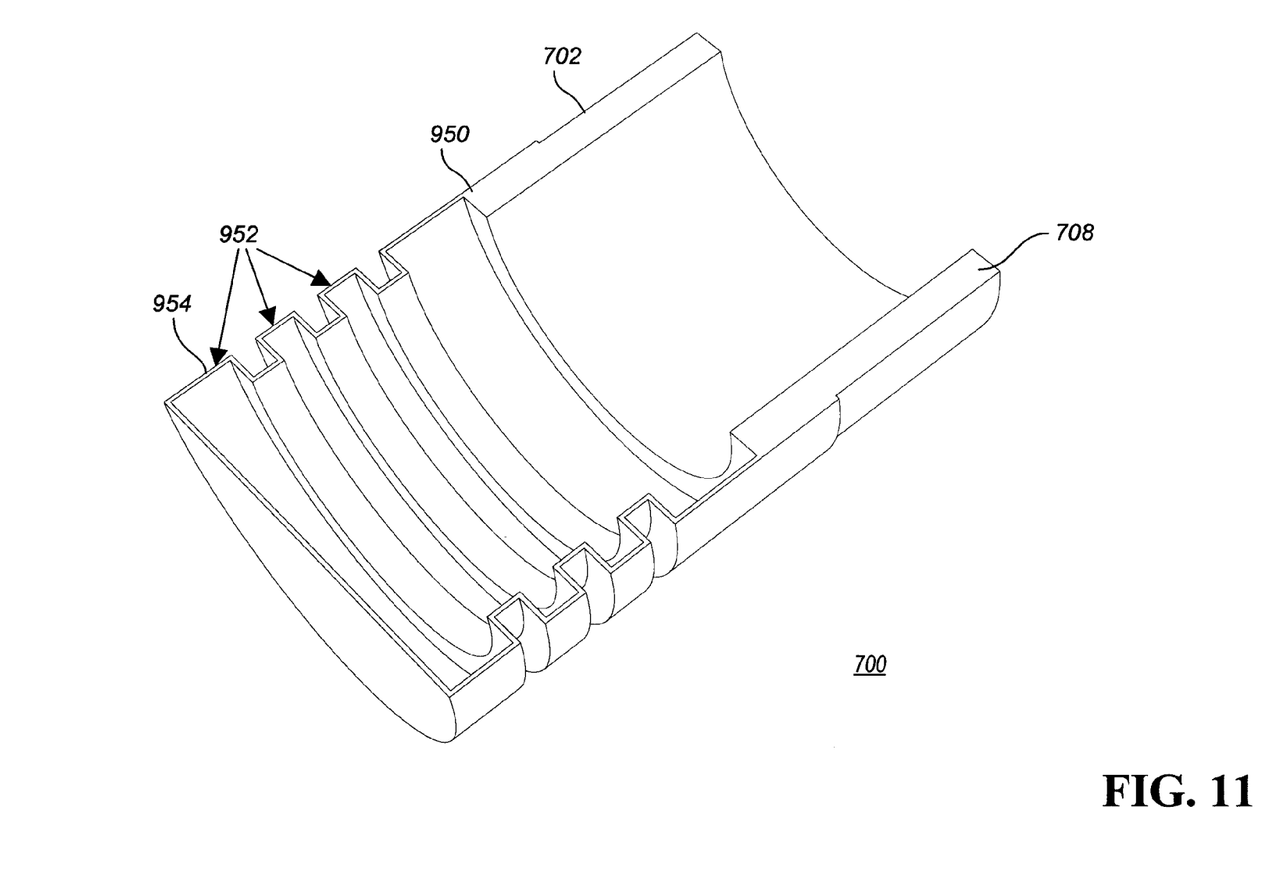
FIG. 11 is a perspective cross-sectional view of the tube of FIG. 9 from which the sacrificial element has been removed in accordance with one preferred embodiment of the present invention.

FIG. 11 illustrates a perspective cross-section of sensor tip assembly 700, where the bellows-like structure of diaphragm 950 may be closer examined. In one preferred embodiment of the present invention, plurality of ridges 952 are formed with relatively squared off corners. In another preferred embodiment, each ridge of plurality of ridges 952 could have more of a rounded shape. In yet another preferred embodiment, plurality of ridges 952 may be formed with sharp corners, such that the shape of the cross-section of corrugated surface 954 resembles a sawtooth form. In other preferred embodiments, the shape of corrugated surface may comprise a combination of a variety of shapes, such as a combination of squared and angled corners. It is contemplated that all these shapes are within the purview of this disclosure and the shape of diaphragm 950 ultimately depends on the shape of sacrificial element 704.

Figure 12:
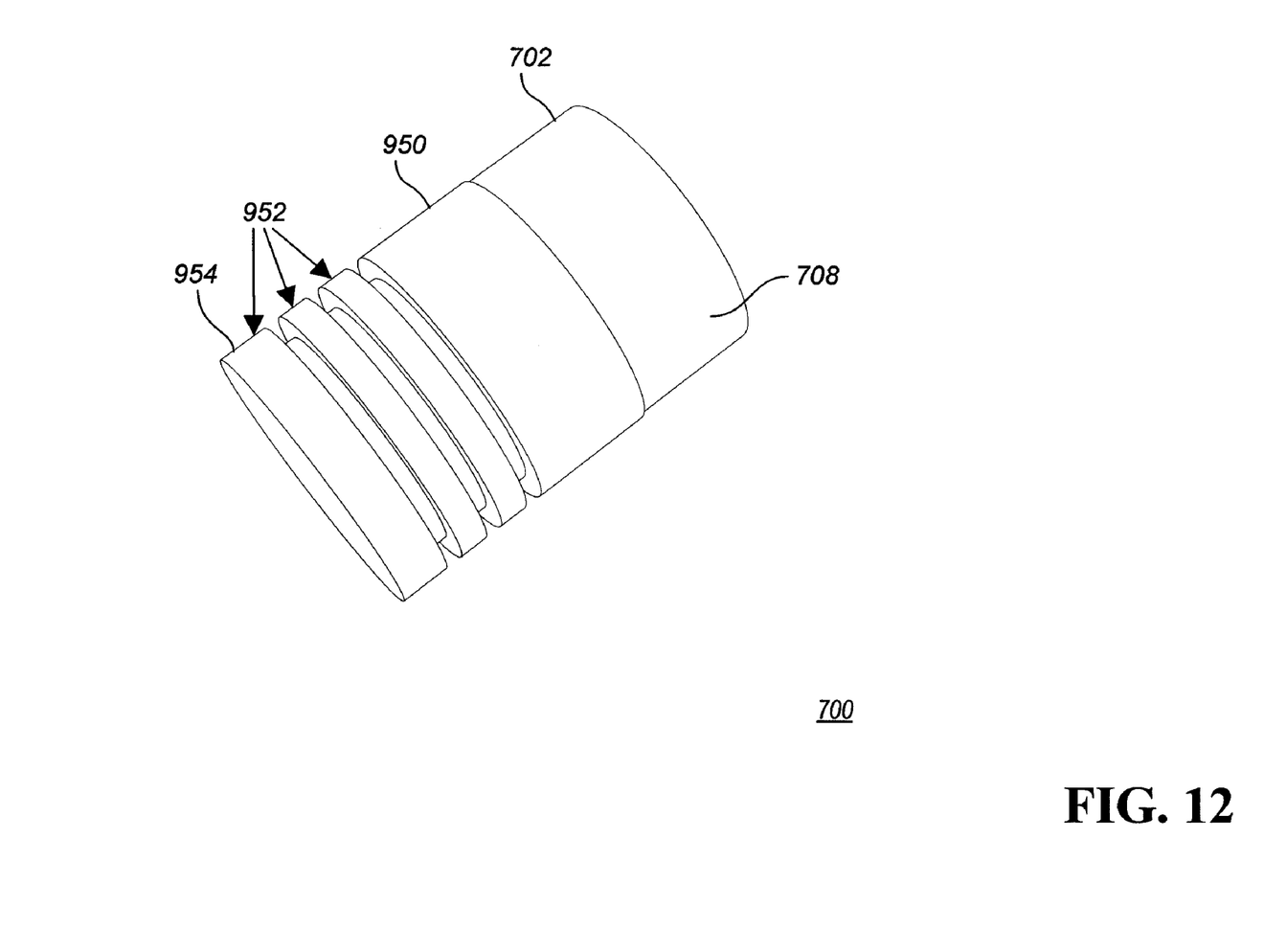
FIG. 12 is a perspective view of the tube and diaphragm assembly of FIG. 10; and, FIG. 13 is a flow diagram of a method of forming a thin diaphragm in accordance with one preferred embodiment of the present invention.

FIG. 12 is a perspective view of the exterior of diaphragm 950 after diaphragm 950 has been formed on housing 702. As illustrated, corrugated surface 954 is located on the side of diaphragm 950. However, it should be noted that the displacement of a corrugated surface of a diaphragm is not limited to one particular area of the diaphragm, nor is the diaphragm limited to having only one area being of a particular shape. For example, the front face of diaphragm 950, although illustrated as being flat in the figures, may be configured to have a corrugated, dimpled, or other surface textures. In another embodiment, the diaphragm may have a spherical shape, similar to that of a light bulb. Any shape that allows the diaphragm to deform under pressure is within the scope of the present invention.

Figure 13:
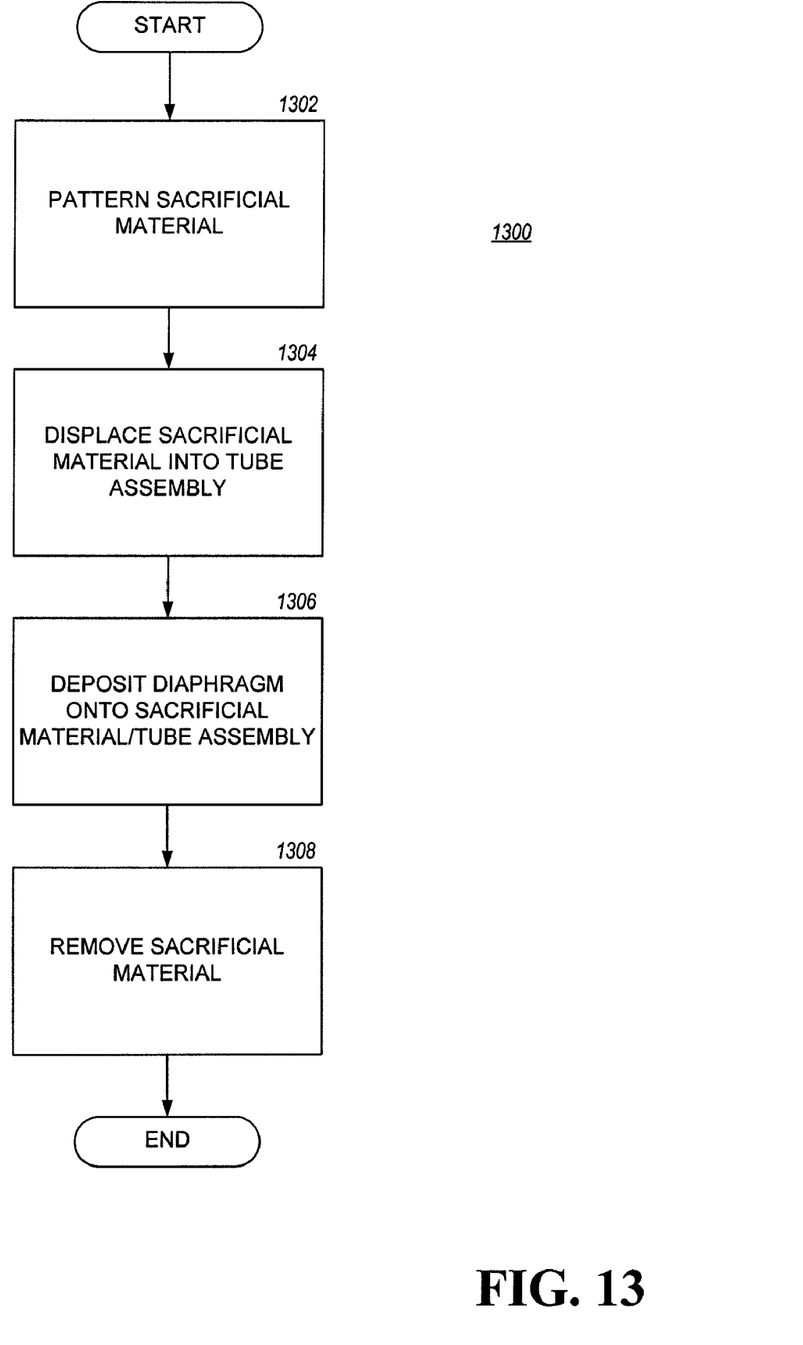

FIG. 13 illustrates a process 1300 for producing diaphragms and membranes in accordance with one preferred embodiment of the present invention. Process 1300 includes a combination of the described steps (e.g., creation of a sacrificial element having a shaped surface so that a diaphragm formed thereon will have particular surface features, insertion of that sacrificial element into a housing, use of electroplating to deposit a thin film for the diaphragm, and removal of the sacrificial element). In one preferred embodiment, the process for creating a thin diagram on a housing begins with step 1302, where a plug or sacrificial element is configured so that the thin diaphragm that is ultimately formed, as described below, will be of a predetermined shape because it will conform to the surface pattern of the sacrificial element. The surface of the sacrificial element on which the diaphragm will be formed may be shaped such that the diaphragm will have a particular surface configuration (e.g., ridged or patterned). In this preferred embodiment, the sacrificial element is shaped before it is inserted into the housing. The sacrificial element is then inserted into the housing in step 1304.

In another preferred embodiment, the sacrificial element is shaped after it is inserted into the housing. In this embodiment, the sacrificial element may be inserted into the housing without a high degree of precision and a portion of the sacrificial element may be left out because the portion of the sacrificial element that protrudes from the housing may be trimmed or shaped after it is inserted. Thus, in this embodiment, the steps of patterning the sacrificial element 1302 and the displacement of the sacrificial element 1304 are reversed as compared to the first preferred embodiment.

In yet another preferred embodiment, the patterning and displacement of the sacrificial element may occur simultaneously. For example, the housing may have a cap that is shaped in a mirror image of the desired final shape of the sacrificial element, and the sacrificial element is in liquid form when it is inserted into the housing. Thus, when the sacrificial element solidifies in the housing, the sacrificial element will take the form of the cap.

In still yet another preferred embodiment, the sacrificial element may be left without a patterned surface, such that the diaphragm that is formed will be relatively smooth and without a particular surface pattern.

In step 1306, after the sacrificial element is inserted into the housing, the diaphragm is formed onto the sacrificial element and the housing. In one preferred embodiment, the diaphragm is formed by electroplating the sacrificial element/housing combination with a metal material suitable for use as a diaphragm. For example, chromium, nickel, cadmium, platinum, and gold are exemplary preferred materials that may be electroplated onto the combined structure (i.e., the diaphragm material that is electroplated onto the sacrificial element/housing combination). In another preferred embodiment, the diaphragm is formed by deposition of the diaphragm material onto the sacrificial element housing combination. Thus, for example, electroplating, electro less plating, and sputtering (for very thin diaphragms) are various deposition methods that may be used.

In step 1308, the sacrificial element is then removed. As the diaphragm is formed onto the sacrificial element/housing combination in a contiguous manner, when the sacrificial element is removed, it leaves behind the diaphragm attached to the housing. In one preferred embodiment, the sacrificial element is removed by an etching process. The removal of the sacrificial element may be effected by such methods as metal etching (e.g., etching using acids); melting (e.g., where the sacrificial material is lead and/or solder); and/or using solvents (e.g., where the sacrificial material is a conductive polymer and/or plastic). Preferably, after the removal of the sacrificial element, the diaphragm remains attached to the housing, with a hermetic seal between the diaphragm and housing without the need of a separate attachment procedure such as laser welding or brazing. As described herein, this method is particularly suited for producing miniature diaphragms and membranes that normally cannot be easily attached to the rest of the sensor system. This process offers great flexibility in terms of the shape and location of the diaphragm.

Thus, what has been described above is a method to fabricate small metal diaphragms and membranes by depositing a suitable metal or dielectric layer directly onto the surface of a housing. A portion of such housing incorporates a sacrificial element that is chemically or thermally removed after deposition, leaving a freestanding diaphragm attached to the rest of the housing at the perimeter of the membrane. The size and shape of the diaphragm is determined by the size and shape of the surface of the sacrificial element. No further steps are required to attach the membrane to the housing.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the present invention is to be defined solely by the scope of the following claims.

What is claimed is:

1. A sensor tip assembly comprising:
   a housing having an interior;
   a sacrificial element disposed in the housing, wherein a first portion of the sacrificial element is disposed in the housing interior and a second portion of the sacrificial element extends outside of the housing, wherein the second portion has a shaped surface; and
   a diaphragm attached to the housing and attached to the second portion of the sacrificial element, the diaphragm including a side wall portion, the side wall portion of the diaphragm comprising a patterned surface that is formed on the shaped surface of the sacrificial element.

2. The sensor tip assembly of claim 1, wherein the diaphragm is hermetically attached to the housing.

3. The sensor tip assembly of claim 2, wherein the corrugated pattern comprises a plurality of parallel rings.

4. The sensor tip assembly of claim 1, wherein the diaphragm further includes a front face portion having a second patterned surface.

5. The sensor tip assembly of claim 4, wherein the second patterned surface comprises a flat surface.

6. The sensor tip assembly of claim 4, wherein the second patterned surface comprises a corrugated surface.

7. The sensor tip assembly of claim 4, wherein the second patterned surface comprises a regularly patterned surface.

8. The sensor tip assembly of claim 1, wherein the diaphragm comprises a chamber.

9. The sensor tip assembly of claim 8, wherein the chamber is expandable.

10. The sensor tip assembly of claim 8, wherein the chamber is compressible.

11. The sensor tip assembly of claim 1, wherein the patterned surface of the diaphragm comprises a corrugated pattern.

12. A method comprising:
    providing a housing having an interior and an opening therein;
    inserting a plug in the housing such that a first portion of the plug is inside the housing and a second portion of the plug extends through the opening and outside the housing;
    forming a cover over the second portion of the plug and at least a portion of the housing, the cover attached to the housing and the second portion of the plug; and
    removing the entire plug, whereby the cover is still attached to the housing, thereby forming a chamber.

13. The method of claim 12, further comprising removing the plug comprises removing the plug using a chemical.

14. The method of claim 12, wherein the step of removing the plug comprises removing the plug using a change in temperature.

15. The method of claim 12, further comprising creating a pattern on the plug.

16. The method of claim 15, wherein creating a pattern on the plug comprises creating a plurality of ridges on the plug.

17. The method of claim 15, wherein creating a pattern on the plug comprises forming a textured surface on at least a portion of the plug.

* * * * *

UNITED STATES PATENT AND TRADEMARK OFFICE
CERTIFICATE OF CORRECTION

| | | |
|---|---|---|
| PATENT NO. | : 7,395,719 B2 | Page 1 of 1 |
| APPLICATION NO. | : 11/552064 | |
| DATED | : July 8, 2008 | |
| INVENTOR(S) | : Marcos Nassar et al. | |

It is certified that error appears in the above-identified patent and that said Letters Patent is hereby corrected as shown below:

On the title page item (73), Assignee:
    Please replace "Custom Sensors & Technologies, Inc." with "Kavlico Corporation"

Signed and Sealed this
Fifteenth Day of December, 2015

Michelle K. Lee
*Director of the United States Patent and Trademark Office*